United States Patent [19]
Endo et al.

[11] 3,968,612
[45] July 13, 1976

[54] MOTOR VEHICLE WINDOW

[75] Inventors: Shiro Endo, Hino; Minoru Yoshida, Hachiohji; Kouichi Yaotani, Akikawa, all of Japan

[73] Assignee: Nissan Motor Co., Ltd., Japan

[22] Filed: Jan. 31, 1975

[21] Appl. No.: 546,012

[30] Foreign Application Priority Data
Feb. 9, 1974 Japan.................................. 49-16448

[52] U.S. Cl................................ 52/400; 52/403; 52/208; 52/468; 156/108
[51] Int. Cl.² ................... E04B 1/62; E04C 1/36
[58] Field of Search ............. 52/204, 398, 400, 403, 52/404, 627, 208, 397, 105, 753 C

[56] References Cited
UNITED STATES PATENTS

| | | | |
|---|---|---|---|
| 2,739,011 | 3/1956 | Thomson .............................. | 52/398 |
| 3,037,810 | 6/1962 | Kelley.................................... | 52/400 |
| 3,274,740 | 9/1966 | Hall ...................................... | 52/400 |
| 3,714,751 | 2/1973 | Lackey.................................. | 52/403 |
| 3,759,004 | 9/1973 | Kent..................................... | 52/403 |
| 3,851,432 | 12/1974 | Griffin ................................. | 52/403 |

*Primary Examiner*—Ernest R. Purser
*Assistant Examiner*—Robert Farber
*Attorney, Agent, or Firm*—Robert E. Burns; Emmanuel J. Lobato; Bruce L. Adams

[57] ABSTRACT

A motor vehicle window assembly comprises a windshield, a window frame flange in parallel spaced relationship to a marginal area on the rear surface of the windshield and a looped trim strip. The looped trim strip includes a channel portion embracing the edge of the windshield and a dam portion spaced apart from and connected with a rear channel wall lying against the rear surface of the windshield by a plurality of bridges. The rear channel wall, dam portion and the rear surface of the windshield forms a channel into which an adhesive is injected. The adhesive bonds the windshield to the flange of the window frame and is prevented from being exposed to the ambient atmosphere by means of the rear channel wall and dam portion which lie against the flange.

4 Claims, 5 Drawing Figures

MOTOR VEHICLE WINDOW

BACKGROUND OF THE INVENTION

The present invention relates to motor vehicle windows.

Usually a windshield is bonded to a flange of a window frame by adhesive, and this presents difficulties in holding the adhesive in position of the marginal area on the rear surface of the windshield during assembly.

It is necessary to attach adhesive to the marginal area of the windshield with even thickness and width, thus requiring skilled labour. In conventional practice, a looped dam member of flexible plastic material such as rubber is bonded to the windshield to define a marginal area and to prevent adhesive from flowing inwardly from the marginal area. However the difficulty of attaching adhesive to the marginal area with even thickness and width is still unsolved and moreover bonding operation of the dam member to the glass, without skilled technique, might result in undulation of a portion of the dam member.

Since in the conventional practice a plurality of spacers have to be attached to a flange of the window frame before pasting an auxiliary agent of the adhesive on the flange, there is possibility of a remaining portion of the flange being unpainted, causing weakening of the bonding of the glass to the flange.

SUMMARY OF THE INVENTION

It is an object of the present invention to provide a motor vehicle window assembly in which as adhesive can be attached to the marginal area of the glass with even thickness and width without requiring skilled labor.

BRIEF DESCRIPTION OF THE DRAWINGS

Other objects, features and advantages of the present invention will become apparent from the following description regarding the accompanying drawings, in which.

DESCRIPTION OF THE PREFERRED EMBODIMENTS

Figure 1:
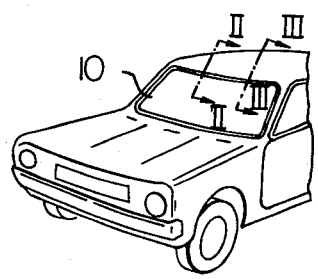
FIG. 1 is a fragmentary perspective view of a motor vehicle having a window assembly of the invention.
Figure 2:
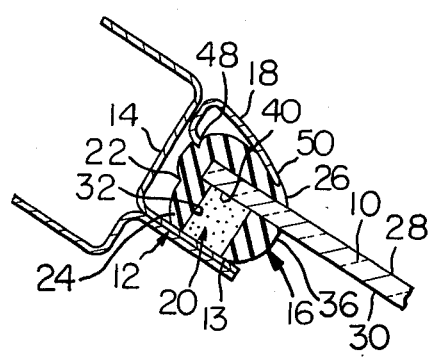
FIG. 2 is a cross sectional view taken substantially on the plane indicated by section line II—II of FIG. 1.
Figure 3:
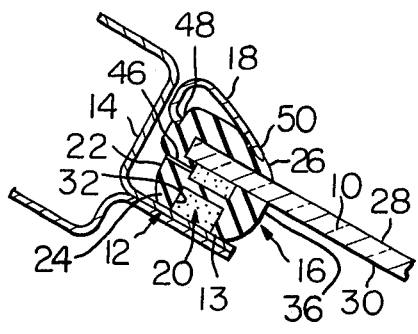
FIG. 3 is a cross sectional view taken substantially upon the plane indicated by line III—III of FIG. 1.

Referring now more particularly to FIGS. 1 to 3 inclusive, the window shown in these figures comprises a windshield 10, a window frame 12 having an attachment surface of flange 13 and a shoulder 14, a looped trim strip 16 (see also FIGS. 4 and 5) which is made of flexible elastic material such as rubber and in which the glass 10 fits, a resilient decorative moulding 18, and an adhesive 20.

Figure 4:
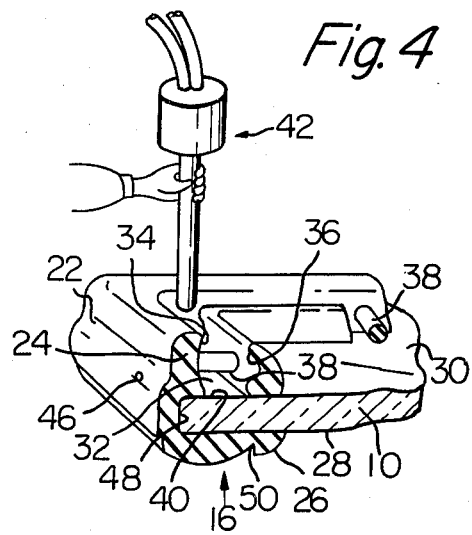
FIG. 4 is a perspective fragmentary view of an assembly of a looped trim of flexible plastic material and a windshield embraced thereby to form an adhesive to the receiving channel.
Figure 5:
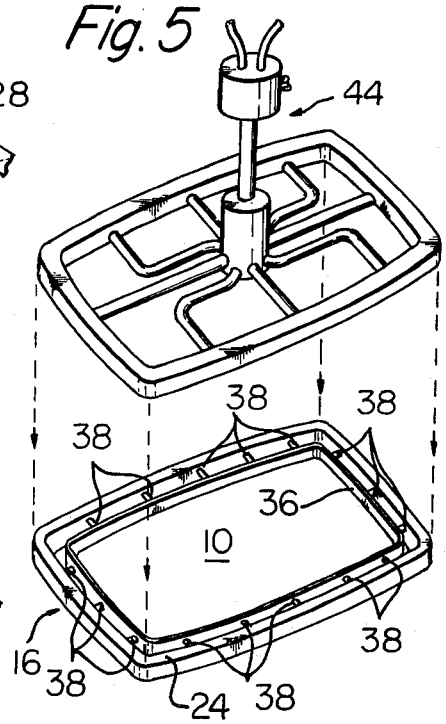
FIG. 5 is a perspective view of the assembly shown in FIG. 4, showing a different injector.

As best seen in FIGS. 4 and 5, the looped trim strip 16 has a channel portion including a base portion 22, a front channel wall 26 and a rear channel wall 24. The front channel wall 26 and the rear channel wall 24 are spaced apart by the base portion 22 such that the channel portion can embrace the edge of the windshield 10 with the front channel wall 26 lying against the front surface 28 of the windshield 10 and the rear channel wall 24 lying against the rear surface 30 of the windshield 10. The trim strip 16 has an integral dam portion 36 spaced apart from the edge 32 of the rear channel wall 24 and connected therewith by a plurality of bridges 38. The dam portion 36 lies against the rear surface 30 of the windshield 10 and forms, in cooperation with the rear channel wall 24 and the rear surface 30 of the windshield 10, an adhesive receiving channel 40. The channel 40 is looped and has a uniform depth and width.

As seen in FIGS. 2 and 3, the rear channel wall 24 engages the flange 13 so that the adhesive receiving channel 40 is closed by the flange 13.

The adhesive 20 filling the adhesive receiving 40 bonds the windshield 10 to the flange 13. The adhesive 20 is injected into the channel 40 with an injector 42 of FIG. 4 or by an injector 44 of FIG. 5 before mounting the windshield 10 on the flange 13.

Preferably a plurality of air vents, only one being shown and designated as 46 in FIGS. 3 and 4 are formed in the front channel wall 24 and they open to the adhesive receiving channel 40. The air vents improve fluidity of injected adhesive along the channel 40. Preferably the rear channel wall 24 and dam portion 36 are tapered (see FIG. 4) so that they allow tolerance of the flange 13 to enable the windshield 10 to be mounted in proper position even if the flange 13 undulates. The front channel wall 26 may be formed with two parallel gutters 48 and 50 for holding decorative moulding 18 in position.

The effects accomplished by the present invention will be paragraphed as follows.

1. The conventional step of properly bonding a dam member, which without skilled labour might result in undulation of portion of the dam member, has been replaced by easier step of fitting the windshield 10 in the channel portion of the looped trim strip 16, which can be carried out even by unskilled labour.

2. Adhesive can be easily attached with even thickness and width along the marginal area of the windshield, since the adhesive receiving channel 40 holds adhesive in position.

3. The conventional step of attaching a plurality of spacers to the flange on a window frame is unnecessitated, since the looped trim strip 16 serves as such spacers.

4. The possibility of a remaining portion of the flange being unpainted with auxiliary agent of adhesive when painting the auxiliary agent on the flange is decreased because it is not necessary to attach spacers to the flange 13.

5. The step of injecting adhesive into the channel 40 can be carried out with an injector 44 as shown in FIG. 4.

6. Rigid bonding connection between the window shielding glass 10 and the flange 13 is provided because the width of adhesive on the windshield 10 is even and there is no area on the flange 13 unpainted with the auxiliary agent and because the adhesive is prevented from being affected by rain or ambient air by walls of the endless channel 40.

7. Due to the elasticity of the looped trim strip 16 the winshield 10 can be mounted to the window frame 13 in position even if the precision of the flange 13 is not too good.

The following effects are accomplished by having decorative moulding 18 held in position by the looped channel member 16.

8. Parts necessary for holding decorative mouldings in position relative to the window frame 12 are unnecessary.

9. Vibration of decorative mouldings 18 during running of vehicle is damped and prevented from transmitted to the frame 12 by the elasticity of the looped trim strip 16.

What is claimed is:

1. A motor vehicle window assembly comprising:
   a windshield;
   a window frame defining a windshield-receiving aperture;
   said window frame having a flange in parallel spaced relationship to a marginal area on the rear surface of said windshield;
   a looped trim strip of flexible plastic material including a channel portion having a front channel wall and a rear channel wall with an edge, a base portion spacing apart said front and rear channel walls such that said channel portion can embrace the edge of the windshield with said front channel wall lying against the front surface of said windshield and the rear channel wall lying against the rear surface of the windshield;
   a dam portion spaced apart from the edge of said rear channel wall and a plurality of bridge portions integrally connecting it therewith such that said dam portion can lie against the rear surface of said windshield, said rear channel wall, the rear surface of said windshields and said dam portion cooperating to define an adhesive receiving channel;
   an adhesive filling said adhesive receiving channel said adhesive bonding the rear surface of said windshield to said flange; and
   said rear channel wall and said dam portion lying against said flange to prevent said adhesive from being exposed to the ambient atmosphere.

2. A motor vehicle window assembly comprising:
   a windshield;
   a window frame defining a windshield-receiving aperture;
   said window frame having a flange in parallel spaced relationship to a marginal area on the rear surface of said windshield;
   a looped trim strip of flexible plastic material including a channel portion having a front channel wall and a rear channel wall with an edge, a base portion spacing apart said front and rear channel walls such that said channel portion can embrace the edge of the windshield with said front channel wall lying against the front surface of said windshield and said rear channel wall lying against the rear surface of the windshield; a dam portion spaced apart from the edge of said rear channel wall and a plurality of bridge portions integrally connecting it therewith such that said dam portion can lie against the rear surface of said windshield, said rear channel wall, the rear surface of said windshield and said dam portion cooperating to define an adhesive receiving-channel;
   an adhesive filling said adhesive-receiving channel, said adhesive bonding the rear surface of said windshield to said flange;
   said rear channel wall and said dam portion lying against said flange to prevent said adhesive from being exposed to the ambient atmosphere;
   said front channel wall having means defining gutters; and
   a decorative moulding engaging the gutters of said front channel wall and retained thereby.

3. A motor vehicle window assembly as claimed in claim 1, in which said rear channel wall comprises air vent holes.

4. A motor vehicle window assembly as claimed in claim 1, in which said front channel wall and dam portion allow tolerance of said flange.

* * * * *